(12) United States Patent
Alcorn et al.

(10) Patent No.: US 9,565,062 B2
(45) Date of Patent: Feb. 7, 2017

(54) RESOURCE DEPLOYMENT MANAGEMENT

(75) Inventors: Byron A. Alcorn, Fort Collins, CO (US); Quoc P. Pham, Spring, TX (US); Jeffrey J. Walls, Fort Collins, CO (US); An D. Dao, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1297 days.

(21) Appl. No.: 13/056,644

(22) PCT Filed: Jul. 29, 2008

(86) PCT No.: PCT/US2008/071458
§ 371 (c)(1),
(2), (4) Date: Jan. 28, 2011

(87) PCT Pub. No.: WO2010/014080
PCT Pub. Date: Feb. 4, 2010

(65) Prior Publication Data
US 2011/0179177 A1     Jul. 21, 2011

(51) Int. Cl.
*H04L 12/24* (2006.01)
*G06F 9/50* (2006.01)
*G06Q 10/06* (2012.01)

(52) U.S. Cl.
CPC .......... *H04L 41/084* (2013.01); *G06F 9/5061* (2013.01); *G06Q 10/06* (2013.01); *H04L 41/0253* (2013.01); *H04L 41/0876* (2013.01); *H04L 41/04* (2013.01)

(58) Field of Classification Search
CPC ............... H04L 41/084; H04L 41/0876; H04L 41/0253; H04L 41/04; G06Q 10/06; G06F 9/5061

USPC ....... 709/226, 201, 213, 217, 223, 227, 230; 713/375, 400, 500; 370/229, 350, 351, 370/395.3–395.7, 412–418
See application file for complete search history.

(56) References Cited

U.S. PATENT DOCUMENTS

| | | |
|---|---|---|
| 5,826,239 A | 10/1998 | Du et al. |
| 6,026,403 A | 2/2000 | Siefert |
| 7,349,980 B1 | 3/2008 | Darugar |
| 7,380,271 B2 * | 5/2008 | Moran et al. ..................... 726/4 |
| 7,475,419 B1 * | 1/2009 | Basu et al. ........................ 726/2 |
| 7,577,722 B1 * | 8/2009 | Khandekar et al. .......... 709/220 |
| 2001/0042139 A1 | 11/2001 | Jeffords et al. |
| 2003/0088786 A1 | 5/2003 | Moran |
| 2004/0093526 A1 * | 5/2004 | Hirsch ........................ 713/202 |
| 2006/0053215 A1 * | 3/2006 | Sharma ........................ 709/223 |
| 2007/0130299 A1 * | 6/2007 | Dean et al. ................... 709/222 |
| 2007/0250833 A1 * | 10/2007 | Araujo et al. ..................... 718/1 |

(Continued)

OTHER PUBLICATIONS

"Account." Merriam-Webster.com. Merriam-Webster, n.d. Web. Dec. 20, 2013. <http://www.merriam-webster.com/dictionary/account>.*

(Continued)

*Primary Examiner* — Joshua Kading
(74) *Attorney, Agent, or Firm* — HP Inc. Patent Department (57) ABSTRACT

A system and method for deploying resources to users. A system includes a computer that executes a resource deployment manager. The resource deployment manager provides an interface for selecting a remote user to whom a central resource is to be assigned, and for selecting a template upon which to base the assignment of the resource to the selected user. Further, the resource deployment manager assigns the central resources to the selected user based on the selected template.

18 Claims, 4 Drawing Sheets

(56) References Cited

U.S. PATENT DOCUMENTS

2008/0082664 A1     4/2008   Popescu
2008/0209016 A1*   8/2008   Karve et al. .................. 709/221
2008/0244595 A1*   10/2008   Eilam et al. .................. 718/104

OTHER PUBLICATIONS

WIPO, PCT/US2008/071458, International Search Report, Apr. 29, 2009.
SUPP EP SR for EP08796780, Sep. 9, 2011.

\* cited by examiner

RESOURCE DEPLOYMENT MANAGEMENT

BACKGROUND

Prior to the advent of the personal computer, a mainframe or mini-computer supporting multiple individual user terminals was the dominant computing paradigm. This centralized architecture allowed for efficient use of expensive computer hardware and software resources by sharing those resources across multiple users. With the coming of the relatively inexpensive personal computer, a new computing model arose that employed computing resources localized at each user to displace the remote and centralized resources typifying the earlier era.

The advantages of the centralized computing model are many however, and ubiquitous networking has led to the resurgence of centralized computing in a variety of forms. In one embodiment, a server provides processing and/or storage resources to one or more remote clients. In other embodiments, a remote client is assigned undivided access to a workstation or personal computer module maintained at a central site. In any embodiment, consolidation of data and program storage and/or computing resources reduces maintenance and support costs, while enabling increased system security. The remote client may take various forms. A remote client having minimal processing and storage capabilities, and that relies on centralized resources for adequate functionality is known as a "thin client."

Centralized computer systems are not without disadvantages. For example, failure of a single server supporting multiple users results in a loss of productivity proportional to the number of users supported. Architectures assigning unshared resources to each remote client serve to mitigate such disadvantages.

Each remote user connecting to a centralized system is assigned a set of resources. The extent of resources available to each user varies in accordance the user's needs. For example, a user may be assigned more or fewer resources in accordance with the applications utilized, or the user's security ranking. Allocation of system resources to users is generally controlled by a system administrator. Flexible and efficient methods for controlling user resource assignments are desirable to administrators of systems supporting a large number of users.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Corporations and other entities deploy centralized computer systems for a variety of reasons. A centralized system provides enhanced security because the entity's data is controlled at a single location. Maintenance and support cost may also be lower than with de-centralized models because those functions can be confined a centralized data center.

Users also benefit from the centralized model. Generally, a user may be able to access his system from any computer connected to the internet. A computer requesting access to a resource of a centralized system may be generally referred to as a "remote access device" or "client." The remote access device need have only enough local resources (e.g., computing power, storage capacity, etc.) to interface with the central resource and provide user input and output. Thus, a remote access device may be simpler, more reliable, and less costly than a computer providing capabilities equivalent to those offered by the central computer through the access device.

An issue arising in the management of a centralized system concerns deployment of the various central resources to the users of the system. When creating or managing accounts granting a user access to a central system, a system administrator assigns resources to the user. The resources assigned to the user may be dedicated to the user (i.e., statically assigned), or may be shared among multiple users (i.e., dynamically assigned). Some embodiments of a centralized system require a system administrator to individually assign system resources to each user. While such an embodiment may be practicable for systems supporting relatively few users (e.g., 10 or fewer), individualized resource deployment becomes extremely burdensome in enterprise level systems supporting larger numbers of users.

Embodiments of the present disclosure allow an administrator of a centralized system to deploy system resources to a large number of users in an efficient manner. Specifically, embodiments of the present disclosure allow a system administrator to deploy resources to users based on a template. The template selected may be, for example, a previously created user account assigned resources similar to those to be assigned to a selected group of users. An existing user account serving as a template for modification of another user's resource allocation is termed a template user. Embodiments also allow creation or modification of a user's resource allocation based on resources assigned to a user in a particular role, where a role allows for allocation of resources based on a users job function, such as software developer, manager, or accountant. A role serving as a template for modification of a user's resource allocation is termed a template role.

Figure 1:
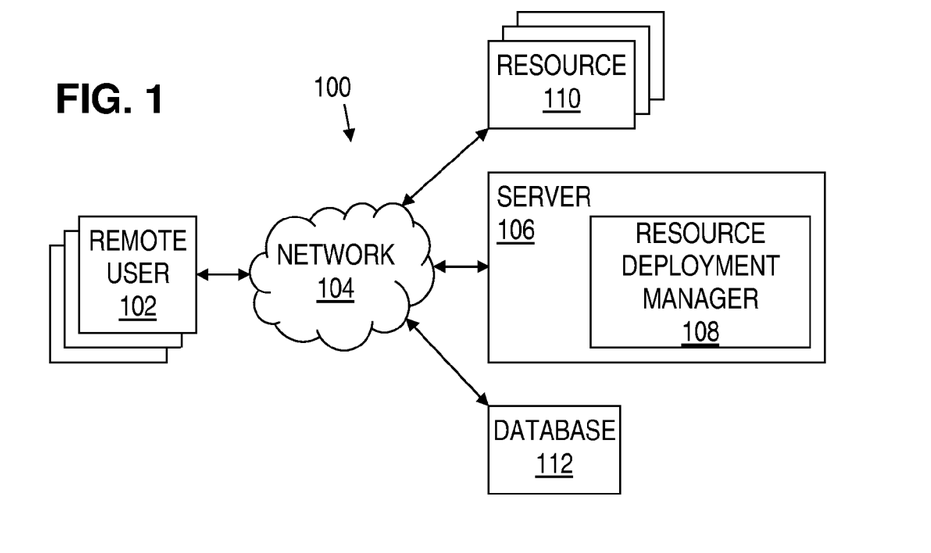
FIG. 1 shows a block diagram of a centralized computer system comprising a resource deployment manager for assigning resources to users in accordance with various embodiments.

FIG. 1 shows a block diagram of a centralized computer system 100 comprising a resource deployment manager 108 for assigning resources to users in accordance with various embodiments. In FIG. 1, a remote user 102 employs a remote access device, for example, a personal computer, or a thin client computer appliance, or a hardware device requiring no software, to communicate with server 106 via the network 104. Through network 104 and server 106 the remote user 102 gains access to a resource 110. As illustrated, embodiments of the system 100 will generally comprise a plurality of remote users 102. The greater the number of remote users 102 requesting access to centralized resources 110, the more arduous the task of allocating resources 110 to the users 102 when an administrator creates or modifies the user's 102 accounts. Thus, embodiments of the present disclosure that enable an administrator to assign resources to users 102 based on a template become more important as the number of remote users 102 increases. Embodiments implement the resource deployment manager 108 as a software program executed by a processor component of a computer (e.g., a personal computer or server). The resource deployment manager 108 program may be stored in a variety of storage devices (i.e., computer readable media) associated with the computer, for example, a hard disk drive, a compact disk read-only memory (CD-ROM), or random-access memory ("RAM"). The program storage device may be directly connected to the computer or connected via wired or wireless network.

The network 104 which connects a remote user 102 to the server 106, may comprise any computer networking technology, for example, a local area network ("LAN"), a storage array network ("SAN"), a wide area network ("WAN"), the internet, etc. Accordingly, the components of system 100 are not restricted to any particular location or proximity to one another, but rather may be located at any distance from one another as required to meet the needs of the enterprise and/or the user.

The resources 110 may be any hardware devices, software programs, or combination of the two not directly attached to the remote access device employed by the remote user 102, to which the remote user 102 seeks access. For example, in some embodiments, the resources 110 comprise computer devices such as workstation blades or PC blades with associated software programs and data storage. In other embodiments, the resources 110 may comprise programs or data storage devices. In yet other embodiments, the resources 110 may comprise rations of the processing capability of a computing device (e.g., a server) and associated software programming.

Database 112 stores data related to server 106 operations in controlling access to the resources 110. For example, an embodiment of the database 112 may store resource assignment information, history, and/or error information. The server 106 accesses the database 112 for storage and retrieval of resource 110 information when allocating the resources 110. Database 112 may be implemented as a software program executed on any of a variety of computing devices, for example, a personal computer, a workstation, a server computer, or any other computing platform adapted to execute the programming of database 112. In some embodiments, the database 112 may be coupled to the server 106 though a network 104 as shown in FIG. 1. In other embodiments, the database 110 may execute on the same computer platform as server 106 as a separate program or as a sub-program of server 106.

The server 106 comprises a software program executing on any of a variety of computer devices, for example, a personal computer, a workstation, a server computer, or any other computing platform adapted to execute the programming of server 106. The server 106 includes the resource deployment manager 108 through which a system administrator creates and manages the accounts of users 102. The creation and management of user accounts includes allocation of the resources 110 to the users 102. The resource deployment manager 108 simplifies user 102 account management by allowing the administrator to assign resources based on a template.

Embodiments of the resource deployment manager 108 allow an administrator to assign the resources 110 to users 102 based on a template user (i.e., an existing user whose resource allocations are replicated as to another user). The resource deployment manager 108 provides a user interface, for example, a graphical user interface ("GUI") through which an administrator controls resources allocations. The user interface allows an administrator to manually select and assign resources 110 to a user 102. Moreover, an administrator wishing to assign a set of resources 110 to one or more selected users 102, where the set of resources 110 is similar to that assigned to an existing user, will select the existing user as the template user, via the user interface. The resource deployment manager 108 replicates the resources assigned to the template user as to the selected users.

Figure 2A:
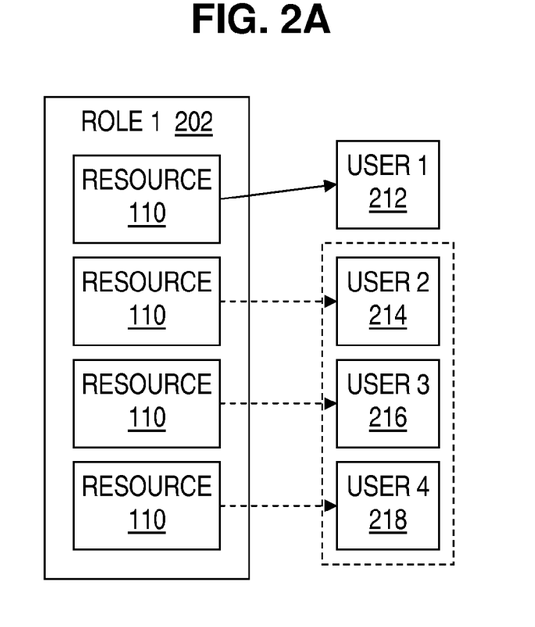
FIG. 2A shows a plurality of instances of a resource for assignment based on a template user in accordance with various embodiments.

FIG. 2A shows the effect of an assignment using a template user 212. In FIG. 2A, an administrator wishes to configure a group of users, User 2 214, User 3 216, and User 4 218, in similar fashion to User 1 212. Thus, the administrator chooses User 1 212 as the template user. User 1 212 is assigned an instance of resource 110 (e.g., a specifically configured PC blade). In some embodiments, resource 110 assigned to template user 212 must be assigned in a role. Requiring resource 110 assignment in a role enables such embodiments to locate similar resources for assignment based on the role. In FIG. 2A, resource 110 is assigned in accordance with role 1 202. The resource deployment manager 108 identifies available instances of resource 110 also assigned to role 1 202 and allocates the resources 110 to users 2-4 214-218 effectively replicating the configuration of user 1 212. If the resource deployment manager 108 is unable to locate sufficient resources 110 to make the requested assignments, embodiments will make assignments to the extent of resources available, and some assignments will fail. For example, if only two instances of resource 110 are available for deployment, user 2 214 and user 3 216 may be provisioned, while configuration of user 4 fails.

Figure 2B:
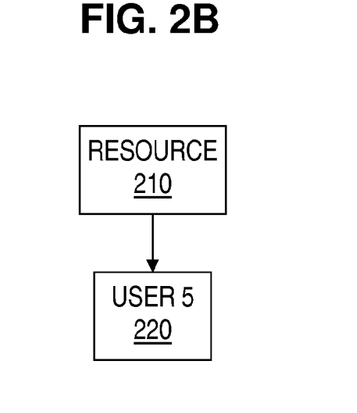
FIG. 2B shows a user not appropriate for application as a template user in accordance with various embodiments.

FIG. 2B shows an example of a user not appropriate for application as a template user in accordance with various embodiments. Here, user 5 220 is assigned resource 210, but resource 210 is not assigned to a role. Because resource 210 lacks a role assignment, some embodiments may prohibit application of user 220 as a template user.

In some embodiments, application of a template user 212 results in reproduction of all characteristics of the template user 212 in the replica user 214. All policies (e.g., resource connection controls), roles, resources, and configuration of the template user 212 may be assigned to the replica user 214. Certain restricted configurations, such as administrative privileges, may not be reproduced in the replica user 214. Some embodiments free resources previously assigned to a user 214 prior to replicating resource assignments of a template user 212 in the user 214.

Embodiments also allow an administrator to assign resources 110 based on a template role (i.e., an existing role wherein the resources allocated to a user in that role are replicated as to another user). An administrator wishing to assign a set of resources to one or more selected users, where the set of resources is similar to that assigned to users in an existing role, will select the existing role as the template role via the user interface. The resource deployment manager 108 replicates the resource assignments of the template role as to the selected users.

Figure 3:
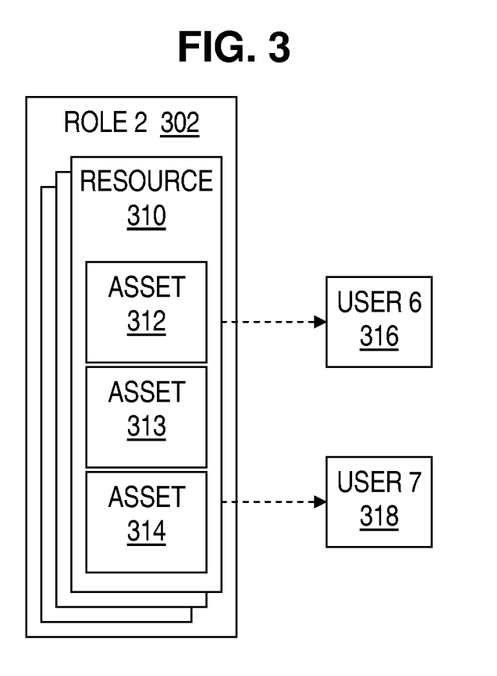
FIG. 3 shows assignment of resources to a user based on a template role in accordance with various embodiments.

FIG. 3 shows assignment of a resource to user 6 316 and user 7 318 based on a template role 302. Users in role 2 are assigned an instance of resource 310 where resource 310 comprises one or more assets 312, 313, 314. Assets 312, 313, 314 can include various hardware components (e.g., computer platforms such as PC or workstation blades or server processing capacity, data storage capacity such as a hard disk space allocation, peripherals such as printer or network access), and/or software components (e.g., operating systems or application programs). As illustrated, multiple instances of resource 310 are available for assignment to role 2 users, and instances of resources 310 are assigned to user 6 316 and user 7 318. If the resource deployment manager 108 is unable to locate sufficient instances of resource 310 to make the requested assignments, some embodiments make resource assignments to the extent of resource availability, and further assignments will fail. For example, if only a single instance of resource 310 is available for allocation, user 6 may be fully provisioned, while configuration of user 7 fails.

In some embodiments, application of a template role results in addition of a resource applicable to that role to a selected user. Thus, if user 6 318 is assigned resources prior to application of the template role 302, user 6 retains the previously assigned resources and resource 310 is added to user 6. Resource deployment manager 108 may not reproduce certain configuration options in a user to whom a template role is applied. For example, if role 302 is a system administrator role, user 6 316 and user 7 318 may not be given administrative privileges.

Figure 4:
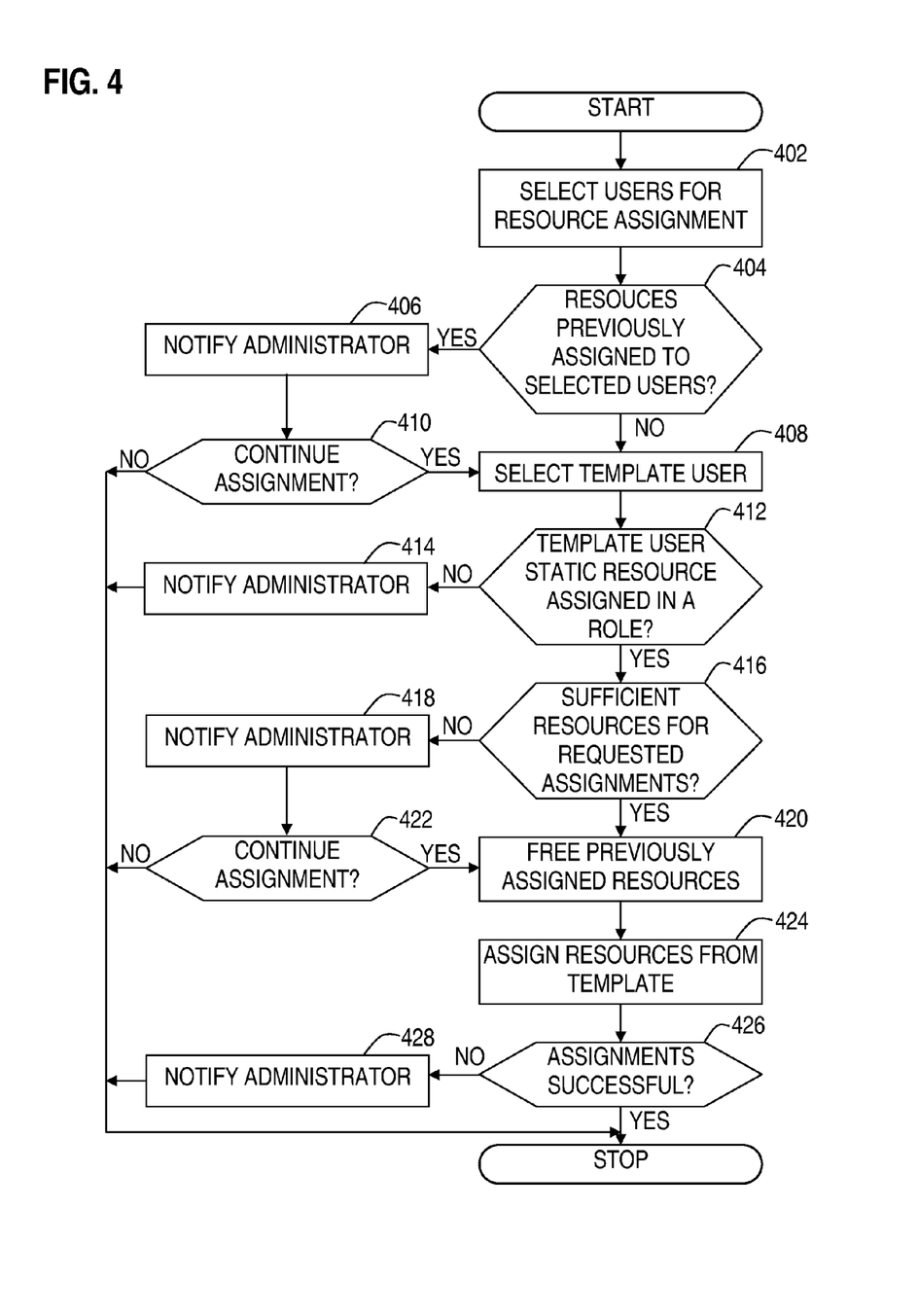
FIG. 4 shows a flow diagram for a method for deploying resources to users based on a template user in accordance with various embodiments.

FIG. 4 shows a flow diagram for a method for deploying resources to users by applying a template user in accordance with various embodiments. Though depicted sequentially as a matter of convenience, at least some of the actions shown can be performed in a different order and/or performed in parallel. In block 402, a system administrator uses the resource deployment manager 108 to select users for resource assignment. The users selected may be new users for whom basic information is retrieved, for example from database 112, or users having previous resource assignments. If, in block 404, the selected users are determined to have resource assignments (i.e., resources were previously assigned to the users), the system administrator is notified in block 406. The system administrator is notified in block 406 because resource assignment based on a template user frees previously assigned resources in some embodiments. Freeing previously assigned resources allows those resources to be reassigned, either in the present template user assignment or in a future assignment. Freed resources may, however, be reassigned to another user, thus exposing data stored in the resource. The administrator may decide to terminate or continue the assignment in block 410.

If, in block 410, the administrator decides to continue the assignment, then the administrator selects a user to serve as the template user in block 408. The roles, resources, policies, and other characteristics of the template user will be replicated in the selected users. Some embodiments require each resource statically assigned to the template user to be in role. A statically assigned resource is dedicated to a user (i.e., not shared between users). For example, a PC blade may be statically assigned to a user, allowing no other user to access the blade. Through the role, the resource deployment manager 108 identifies available instances of the statically assigned resource for allocation to the selected users. In block 412, if a resource statically assigned to the template user is not assigned in a role, then the administrator is notified, in block 414, and the assignment is terminated.

If, in block 412, all resources statically assigned to the template user are assigned in a role, then, in block 416, available resources are identified to determine whether there are sufficient resources to perform the requested assignments. If available resources are insufficient to perform the requested assignments, then the administrator is notified, in block 418, and may chose to terminate or continue with the assignment in block 422.

If sufficient resource for the assignment are identified in block 416, or the administrator decides to continue the assignment with deficient resources in block 422, then, in block 420, as explained above, some embodiments free resources previously assigned to the selected users. After previously assigned resources are freed, in block 420, resources are assigned to the selected users based on the template user in block 424. The template user's resources, policies, roles, and other characteristics are reproduced in the selected users.

In block 426, the resource deployment manager 108, determines whether the resource assignments were successful. If they were unsuccessful, for example, if a resource became unavailable sometime between its identification in block 416 and its attempted assignment in block 424, the administrator is notified, in block 428, and failed assignments are noted.

Figure 5:
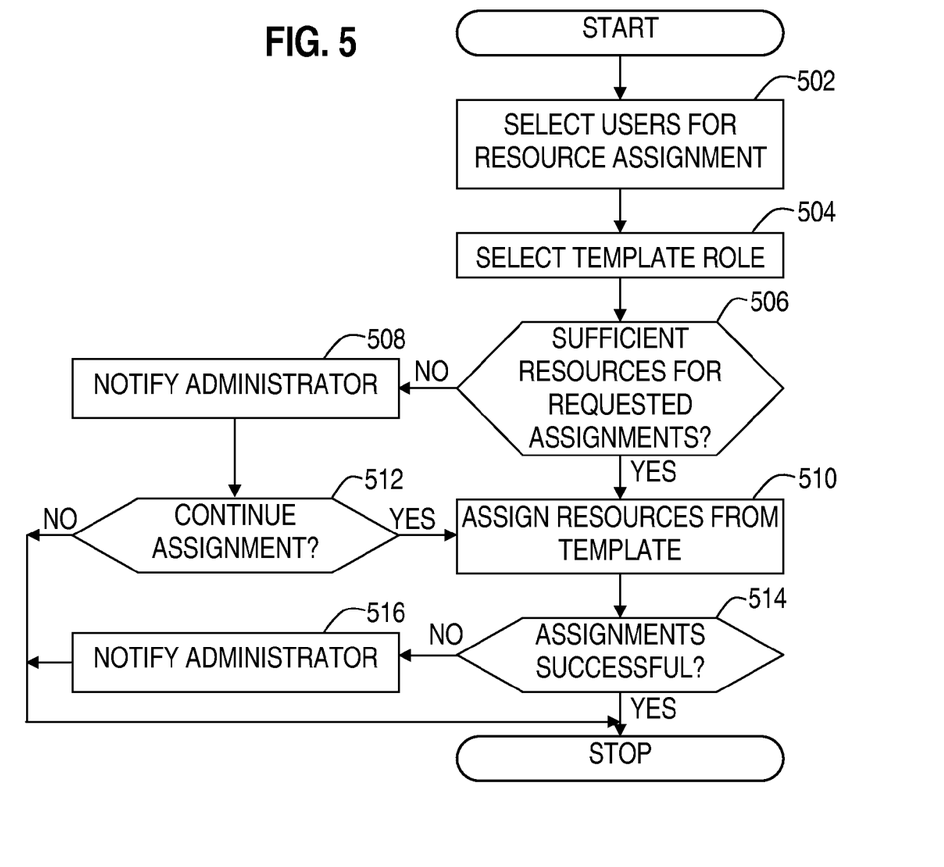
FIG. 5 shows a flow diagram for a method of deploying resources to users based on a template role in accordance with various embodiments.

FIG. 5 shows a flow diagram for a method of deploying resources to users by applying a template role in accordance with various embodiments. Though depicted sequentially as a matter of convenience, at least some of the actions shown can be performed in a different order and/or performed in parallel. In block 502, a system administrator uses the resource deployment manager 108 to select users for resource assignment. The users selected may be new users for whom basic information is retrieved, for example from database 112, or users having previous resource assignments.

In block 504, the system administrator selects a role to serve as the template role. Resources similar to those assigned to users in the template role will be assigned to the selected users.

In block 506, the resource deployment manager identifies available instances of resources similar to those statically assigned in the role. If available resources are insufficient to perform the requested assignments, then the administrator is notified, in block 508, and may chose to terminate or continue with the assignment in block 512.

If sufficient resources for the assignment are identified in block 506, or the administrator decides to continue the assignment with deficient resources in block 512, then, in block 510, resources are assigned to the selected users based on the template role. Some embodiments thus add the resources assigned based on the template role to any resources previously assigned to the selected users.

In block 514, the resource deployment manager 108, determines whether the resource assignments were successful. If they were unsuccessful, for example, if a resource became unavailable sometime between its identification in block 506 and its attempted assignment in block 510, the administrator is notified, in block in 516, and failed assignments are noted.

The above discussion is meant to be illustrative of the principles and various embodiments of the present invention. Numerous variations and modifications will become apparent to those skilled in the art once the above disclosure is fully appreciated. For example, while the exemplary embodiments have been described as applying a template user or a template role, those skilled in the art will recognize that various user groupings may be applied as templates to optimize deployment of resources to users in an enterprise computing system. It is intended that the following claims be interpreted to embrace all such variations and modifications.

What is claimed is:

1. A system, comprising:
a computer that executes a resource deployment manager to manage computing resources,
wherein the resource deployment manager:
provides an interface for selecting a plurality of remote users to whom a central resource is to be assigned, and for selecting a template user upon which to base the assignment of instances of the central resource to the plurality of selected remote users, wherein a resource assigned to the template user serves as a template for assignment of the instances of the central resource to the plurality of selected remote users, and the plurality of selected remote users are different from the template users, and
automatically assigns a different instance of the central resource to each of the plurality of selected remote users based on the selected template.

2. The system of claim 1, wherein the resource deployment manager automatically assigns each different instance of the central resource based on a single template user selection, and the central resource comprises a plurality of assets.

3. The system of claim 1, wherein the resource deployment manager assigns the central resource to the plurality of selected remote users based on availability of an instance of the central resource designated to a role specified by the template.

4. The system of claim 1, wherein the resource deployment manager provides an interface for selecting a template role upon which to base the assignment of the resource to the plurality of selected remote users, and assigns the central resource to the plurality of selected remote users based on the template role.

5. The system of claim 1, wherein the template specifies assignment of administrative privileges to the plurality of selected remote users and the resource deployment manager excludes administrative privileges from the central resource assigned based on the template.

6. The system of claim 1, wherein the resource deployment manager assigns instances of the central resource to a plurality of remote users to the extent instances of the central resource are available for allocation based on the template.

7. The system of claim 1, wherein the resource deployment manager provides an interface for:
manually assigning the central resource to the plurality of selected remote users.

8. The system of claim 1, wherein the resource deployment manager is to:
automatically assign the central resource to the plurality of selected remote users based on the template user; and automatically assign the central resource to the plurality of selected remote users based on a template role.

9. The system of claim 1, wherein the central resource comprises a processor.

10. The system of claim 1, wherein the resource deployment manager is to free resources previously assigned to the plurality of selected remote users based on assignment of the central resource to the selected user.

11. The system of claim 1, wherein the resource deployment manager is to prohibit selection of another user to serve as the template user based on the other user not being assigned to a role.

12. A method, comprising:
selecting, by a processor, a template for assignment of a resource of a centralized computing system;
selecting, by the processor, a plurality of users for assignment of the resource based on the template; wherein the selected plurality of users lack accounts on the system;
wherein the template comprises a template user whose resource assignment is replicated to assign the resource to the plurality of selected users; and
creating, by the processor, based on the template, accounts for the users on the system, wherein the accounts automatically assign different instances of the resource to the plurality of selected users based on the template, and are separate from the template.

13. The method of claim 12, further comprising selecting a template role defining resource assignments to a user in the role to assign the resource to the plurality of selected users.

14. The method of claim 12, further comprising determining whether sufficient instances of the resource are available to allocate the instances of the resource to the plurality of selected users based on the template.

15. A non-transitory computer readable medium having computer readable program code embodied therein, the computer readable program code comprising:
instructions that allow a system administrator to select a plurality of users to whom a central resource is to be assigned;
instructions that allow a system administrator to select a template user for assigning the central resource to the plurality of selected users, wherein a resource assigned to the template user serves as a template for assignment of the central resource to the plurality of selected users, and the plurality of selected users are different from the template user; and instructions that automatically assign different instances of the central resource to the plurality of selected users based on the template.

16. The computer readable medium of claim 15, further comprising instructions that allow the system administrator to select a template role as the template for assigning the central resource to the plurality of selected users.

17. The computer readable medium of claim 15, further comprising instructions that determine whether sufficient instances of the central resource are available to allocate an instance of the central resource to the plurality of selected users based on the template.

18. The computer readable medium of claim 15, further comprising instructions that assign the central resource to the plurality of selected users based on availability of an instance of the central resource designated to a role specified by the template.

* * * * *